UNITED STATES PATENT OFFICE.

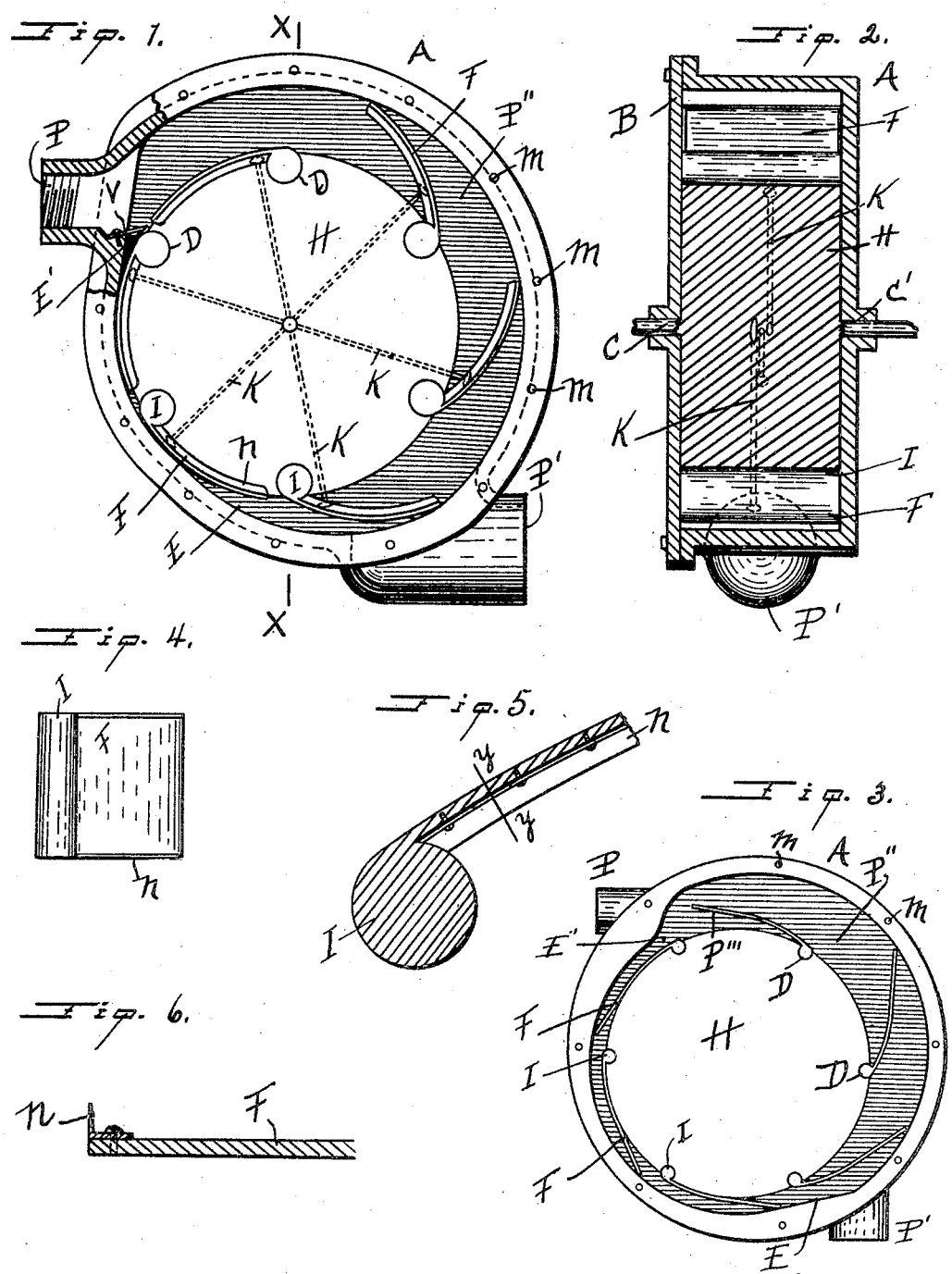

AMOS H. CARPENTER, OF STOCKTON, CALIFORNIA.

METER AND MOTOR FOR STEAM AND WATER.

No. 801,849.      Specification of Letters Patent.      Patented Oct. 17, 1905.

Application filed March 1, 1904. Serial No. 196,015.

*To all whom it may concern:*

Be it known that I, AMOS H. CARPENTER, a citizen of the United States, residing at Stockton, in the county of San Joaquin, State of California, have invented a new and useful Improvement in Meters and Motors for Steam and Water; and I declare that the following is a full, clear, and exact description of the invention, which will enable others skilled in the art to which it appertains to make and use the same, reference being had to the accompanying drawings, and to the letters of reference marked thereon, which form a part of this specification.

My invention relates to certain improvements in meters and motors for steam and water; and the object of my improvement is to provide a machine that will correctly measure all the water or steam that passes through it, that will work in any position, and that while measuring such water and steam it will also communicate power to its axis, serving as a stem to the indicator that may be applied to any desired use. This I accomplish by the use of the peculiar construction, novel combination, and adaptation of parts hereinafter described, and particularly pointed out in the claims hereunto annexed, reference being had to the accompanying drawings for a better comprehension thereof, in which—

Figure 1 is a top view of the meter and motor with the lid removed. Fig. 2 is a sectional view of the meter and motor with lid attached on line drawn through their centers at X X. Fig. 3 is a top view of the machine with the lid removed and without the tappet-rods. Fig. 4 is a side view of one of the floats or blade-arms detached from the hub. Fig. 5 is an enlarged sectional longitudinal view of the blade-arm, showing the packing-strip thereon. Fig. 6 is a transverse sectional view of the blade-arm at Y Y.

My improvement consists, essentially, of the hollow basin A, the general outline of which is circular in form, its sides being constructed at right angles to its floor and lid, and which may be made of any desired depth or diameter, and which is provided at each end with suitable hollow pipe projections P and P', whereby it may be connected with steam or water pipes such as are ordinarily used.

P represents the end where the water or steam enters the meter or motor, and P' its exit, and P'' the passage-way for water or steam through the meter and motor between the hub H and the inner surface of the basin.

The inside of the basin is made to receive a cylindrical hub H, the length of which is equal to the depth of the basin, and which is shown in the drawings to be solid, and which may be made of any suitable diameter, and which has one end of its axis C journaled in the lid and the other end C' journaled in the bottom of the basin at a point outside of their respective centers, so that its periphery on one side reaches nearly to the surface of the inner side of the basin and leaving on the other side a sufficient space for the passage of the water or steam through the basin from P to P' through the passage-way P''. Four or more cylindrical recesses D, with sides penetrating through the periphery of said hub, are constructed in said hub at suitable distance apart and extend its entire length. Said recesses are parallel with the axis and exterior surface of hub, and the openings therefrom to the rim appear like slots running lengthwise through the surface of said hub and are made to receive the floats or blade-arms F.

Upon one end of the floats F is fastened laterally a cylindrical post-like attachment I, which is made to fit loosely and turn in the said cylindrical recess D of the hub, and thereby forms a hinge in its periphery, and which is of the same length as the hub, and when placed in position in said recess the attached float or blade-arm projects through the lateral opening thereof from the periphery of the hub and is broad and long enough to completely fill the passage-way P'' for the water or steam on the outer side of the hub from P to P'.

At E on the inner side of the basin and at its lower side, as represented in Fig. 1, where the said inner surface of the basin recedes from the periphery of the hub, such side is beveled and forms a cam, whereby the floats or blade-arms when opened to fill the passage-way P'' are closed by coming in contact with the cam E and are closely folded against the side of the hub, thereby completely filling the space between the periphery of the hub and the interior surface of the basin from E to E' until the point E' is reached, where the interior surface of the basin again recedes from the hub to allow the float or blade-arm to open and project itself across the passage-way P''. The blade-arms may be curved laterally and may be provided in pairs, and a tappet-rod K, that is constructed a little longer than the diameter of the hub, passes through its body and operates one pair of blade-arms, one end of which said tappet-rod works against one blade and its other end against the blade that is diametrically opposite on the other side of the hub, and when the float F comes in contact with the cam or beveled side of the basin at E it forces the rod K against the float on its opposite side at E', and thereby opens and projects the same across the passage-way P''.

By making the floats or blade-arms with less curvature or by beveling the rear end of such blades on the inner side thereof so that the extreme end of such blades do not fold closely against the periphery of the inside hub, but leave a small space or chamber, triangular or otherwise, between such ends and said periphery, as shown in Fig. 3, the tappet-rods K may be dispensed with, for the water or steam in passing through the entrance-hole P enters such space or chamber between the end of said blade-arm and the periphery of said inside hub and by its pressure therein and against the projecting end of the float causes the same to open and project across the passage-way P'' without the use of any mechanical means for that purpose.

By inverting the meter from its position as shown in Figs. 1 and 3 the tappet-rods may likewise be dispensed with, for the process of opening and closing the blade-arms may be assisted by gravity, for it will be observed when so inverted that as soon as the outer end of the float passes the entrance-opening P its own weight will cause it to fall across the said passage-way P'', and before it reaches the cam E in the revolution of the inside hub its own weight will likewise cause it to fall back across the passage-way P'' and fold itself against the periphery of the hub; but as gravity can only be relied upon to assist in opening and closing the blade-arms when the revolutions of the inside hub are moderately slow the said cam and the chamber between the end of the blade-arms and the periphery of the hub are necessary features of the mechanism when the inside hub rotates with considerable speed.

The cover B of the basin is made flat, and its general outline is circular in form, so as to completely cover the hole in the basin, and serves as a journal for one end of the axis, and the same is attached to the body of the basin by means of screws penetrating the screw-holes M. To prevent the steam or water from leaking through any space that may be left between the edge of the blade-arms and the side of the passage-way P'', a flexible packing-strip N, that is made L-shaped and extending across each of the two sides of the floats, is fastened thereon by screws, and by means thereof the device may be kept steam and water tight by the proper adjustment of said packing-strips, and upon the inner side of the basin near the entrance P and at the point E'', where the inner side of the basin commences to recede from the periphery of the hub H, a check-valve V is fastened by screws and which may be made of any flexible material and the edge of which is made to come closely in contact with the blade-arms folded against the periphery of the hub, so that no steam or water can pass on the rear side of the hub.

When the hub, with its floats or blade-arms, hinged in its periphery, is placed in position in the basin, the lid screwed tightly thereon, and water or steam is made to pass into the meter and motor at their entering-point through the opening P, it strikes the float or blade-arm F, that obstructs its passage through the passage-way P'' of the basin, and forces it through said passage-way until it comes in contact with the cam E on the side of the basin and folds itself against the periphery of the hub, and at the same time that it closes against the hub the tappet-rod K pushes against its corresponding float on the opposite side of the hub and opens it, so that it extends across the passage-way P'', and the same process is continued with it and the other pairs of blade-arms, which thereby causes the hub to revolve in the basin, and the upper portion of the axle C being connected with the stem of the indicator and with any convenient pulley to which power may be applied thus counts the revolutions of the hub so made and at the same time transmits its power to any desired mechanism. When the tappet-rods are omitted and the meter is inverted from its position as shown in Figs. 1 and 3 and the blade-arms are opened and thrown across the passage-way P'' by the induction of either steam or water through the entrance-hole P into the small chamber between the end of the blade-arms and assisted by gravity in such opening and closing, the same process is repeated; but no mechanical means are used or required to open such blade-arms.

What I claim as my invention, and desire to secure by Letters Patent, is—

1. The combination of a hollow basin, provided with a lid covering the chamber therein, a suitable entrance thereto and exit therefrom for steam, water or other liquid, and adapted on its inside to receive a cylindrical hub, the axis of which is journaled in the lid and floor of said basin at a point outside their centers, and from the periphery of which project four or more floats or blade-arms, which are hinged therein and open and close against the side of its periphery, and through the body of which extend tappet-rods of greater length than its diameter, the respective ends of which are designed to rest upon and work against blade-arms on diametrically opposite sides of said hub, and a beveled surface or cam in the pathway of said blades constructed on the inner and lower side of said basin to operate said floats, substantially as set forth.

2. The combination of a hollow basin, provided with a lid covering the chamber therein, an opening therein on either side by which said chamber may be connected with steam or water mains, a cylindrical hub adapted to work therein, the axis of which is journaled in the lid and floor of the basin at a point outside their respective centers, and from the periphery of which project four or more blades or floats, which are hinged on its rim and adapted to open and close against the side of said hub and, when so folded, to completely fill the space between the inside surface of the basin and the periphery of the hub on its rear side, and through the body of which project tappet-rods of slightly greater length than the diameter of the hub, the respective ends of which rest against the floats or blades located on opposite sides of said hub, the inner wall of said basin having a cam portion in the pathway of said blades to operate and swing the adjacent blade against the periphery of the hub and to open its corresponding blade on the opposite side of said hub by means of said tappet-rods, substantially as set forth.

3. The combination of a hollow basin, the sides of which are constructed at right angles to its floor and lid, provided with a suitable cover for the opening therein and means for fastening the same thereon, suitable entrance thereto and exit therefrom for water or steam that are adapted to fit and connect the same with ordinary pipes or mains, said basin being formed with a cam-surface located upon the inside periphery of the basin, a cylindrical hub, of any suitable diameter, the length of which is equal to the depth of the basin, and the axis of which is journaled in said lid and floor of the basin, at a suitable distance outside their centers, and from the periphery of which project four or more floats or blade-arms, hinged in a cylindrical recess constructed in its periphery, by means of a post-like attachment laterally attached to an end of the float or blade-arm that works loosely in said recess and thereby to open and extend crosswise of the passage-way in the basin on one side, and to close against the periphery of the hub on the other side, and with said basin and the entrance thereto so arranged that said blade-arms will drop, by the force of their own weight across the passage-way for such steam, water or other liquid, upon passing the entrance-hole, and will fold themselves against the hub before they reach, in their revolution, the cam located upon the inside periphery of the basin, and a check-valve to prevent the steam or water near the entrance from passing behind the hub, substantially as set forth.

4. A hollow basin, the sides of which are constructed at right angles to its floor and lid, provided with a suitable cover for the opening therein and means of fastening the same thereon, suitable entrance thereto and exit therefrom for water or steam, a cylindrical hub adapted to turn therein, of suitable diameter, and the length of which is equal to the depth of the basin, and the axis of which is journaled in said lid and floor of the basin at a suitable distance outside their centers, and from the periphery of which project floats or blade-arms, hinged in a cylindrical recess in its periphery, by means of a post-like attachment, laterally attached to an end of the float, that works loosely in said recess, that open and project crosswise of the passage-way of the basin on one side, and that close against the periphery of the hub on the other side, and through the body of which hub extend tappet-rods, T-shaped at each end, and of slightly-greater length than the diameter of said hub, the respective ends of which rest or work against the floats or blade-arms located on opposite sides of said hub, said basin being formed with a cam-surface located in the passage-way of said blades when extended, on the inner side of the basin, to operate said floats and close the adjacent blade against the periphery of the hub and to open its corresponding float or blade on the opposite side of the hub by means of said tappet-rods being pushed against the closed blade on said opposite side, L-shaped packing-strips screwed upon the outer side of the floats at the edge thereof to prevent the passage of steam or water between the side of the floats and the inside surface of the basin, and a check-valve to prevent the steam or water near the entrance from passing behind the hub, substantially as set forth.

5. The combination, in meters and motors for steam and water, of a hollow basin, the sides of which are constructed at right angles to its floor and lid, provided with a suitable lid to cover the chamber therein, a suitable pipe-opening therein on either side by which it may be connected with steam or water mains, and adapted on its inside to receive a cylindrical hub adjacent to one side of its chamber so that the periphery of said hub with its folded blade-arms comes closely in contact with one side of the inner surface of the chamber, and thereby leaves a passage-way on its other side, a solid cylindrical hub, of any suitable diameter, the length of which is equal to the depth of the basin, and the axis of which is journaled in lid and floor of the chamber at a suitable point outside of their respective centers, and from the periphery of which project four or more blade-arms or floats, hinged on its periphery, and adapted to open and close against the side of said hub, and through the body of which extend two or more tappet-rods, T-shaped at each end and of slightly greater length than its diameter, the respective ends of which rest upon and work against the floats or blade-arms located on opposite sides of the hub, and a cam in the pathway of said blades located on the inner surface of the basin to operate said floats and swing the adjacent blade against the periphery of the hub and to open its corresponding blade on the opposite side of the hub by means of tappet-rods so that it projects therefrom and extends across its passage-way in the basin, L-shaped packing-strips fastened upon the steam or water side of the blade-arms at the edges thereof to prevent the steam or water from passing between said sides and the inside surface of the basin, and a check-valve to prevent the steam or water near the entrance from passing behind the hub, substantially as set forth.

6. The combination, in meters and motors for steam and water, of the basin A, the lid B, the screw-holes M, the pipe-openings P and P', the hub H located within the chamber, with one end of its axis C journaled in the cover, and the other end C' journaled in the floor of the basin at a point outside of their centers, so that the hub with its blade-arms folded to its periphery comes closely in contact with the inside surface of the basin on one side, and leaves a passage-way P" for the water or steam on the other side, the floats or blade-arms F, hinged on the periphery of the hub so as to open across the passage-way P" and fold against the periphery of the hub, with the post-like attachment I, the cylindrical recess D opening upon the periphery of the hub and adapted to receive loosely the post-like attachment I with the blade-arms projecting through the orifice of said recess, tappet-rods K with T-shaped ends extending through said hub to operate said floats or blade-arms, the cam E to operate said blades by opening and closing the same, L-shaped packing-strips N, and the check-valve V, substantially as shown and described and for the purposes set forth.

7. The combination, in meters and motors for steam and water, of a suitable basin A, provided with a suitable lid B, and on its inside with the hub H having floats F hinged in its periphery by cylindrical arm-posts I laterally attached to an end of the floats F, working in the cylindrical recess D with blades projecting therefrom that alternately open outward from and shut against the hub in its revolutions the tappet-rods K the respective ends of which rest upon and work against the blade-arms on opposite sides of the hub, the cam portions E, in the pathway of said blades, the check-valve V, substantially as shown and described and for the purposes set forth.

In testimony whereof I have signed my name to this specification in the presence of two subscribing witnesses.

AMOS H. CARPENTER.

Witnesses:
   WM. BEASLEY,
   CHARLES BEASLEY.